A. MUFF.
MANUFACTURE OF WING NUT BLANKS.
APPLICATION FILED SEPT. 8, 1920.

1,395,762.

Patented Nov. 1, 1921.

INVENTOR.
Adam Muff,
by Parker & Stockmon
ATTORNEYS.

UNITED STATES PATENT OFFICE.

ADAM MUFF, OF BUFFALO, NEW YORK.

MANUFACTURE OF WING-NUT BLANKS.

1,395,762.                    Specification of Letters Patent.     Patented Nov. 1, 1921.

Application filed September 8, 1920. Serial No. 408,984.

*To all whom it may concern:*

Be it known that I, ADAM MUFF, a citizen of the United States, residing at Buffalo, in the county of Erie and State of New York, have invented a new and useful Improvement in the Manufacture of Wing-Nut Blanks, of which the following is a specification.

This invention relates to improvements in the manufacture of wing nuts and more particularly to improvements in the manufacture of blanks from which wing nuts are formed.

Heretofore, wing nuts have been made by drop forging and then drilling and tapping the blanks. Certain objections to this method are that the process precludes the manufacture of wing nuts of steel, the metal of which the blanks are made is usually relatively soft with the result that in certain uses the threads of the nut are easily stripped. Furthermore, the drop forgings are relatively expensive, as according to the present methods only about four to eight nut blanks may be formed at a heat, it being necessary for the operator of the drop forging machine to return the bar, from which the blanks are being forged, to the furnace for reheating when that number of blanks have been formed. This results in comparatively high labor costs due to the time lost in removing the bars from the machine and inserting heated bars from the furnace. After the blanks have been formed they are trimmed and tumbled to smooth off the rough surfaces and then ground to cut away the ridges thereon and then drilled and tapped.

One of the objects of the present invention is to provide for the manufacture of wing nut blanks of steel or other hard metal; also to provide a novel blank bar of steel or other metal from which the wing nut blanks may be readily formed, and also to substantially reduce the number of operations required to form the wing nut blanks.

Other objects are to reduce the cost of manufacture of wing nut blanks and to provide improvements in the manufacture thereof in the other respects hereinafter described and set forth in the claims.

In the accompanying drawings:—

Figure 1:
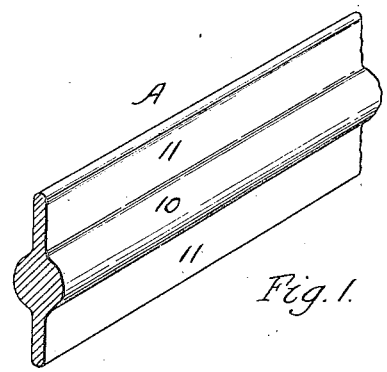
Figure 1 is a fragmentary perspective view of a nut forming blank bar according to the invention.

Briefly stated, the invention contemplates the manufacture of wing nut blanks from bar metal by rolling or otherwise forming a blank bar or strip from which a plurality of finished nut blanks may be stamped or cut and permits of wing nut blanks being readily formed of steel or other hard metals.

Referring to the drawings:—

Figure 2:
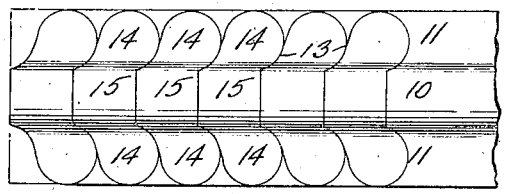
Fig. 2 is a fragmentary plan of the blank of Fig. 1, indicating the lines along which the nut blanks are cut.
Figure 3:
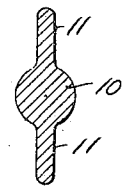
Fig. 3 is an end view thereof.

According to the invention there is provided a metal blank bar or strip A. This blank bar may be shaped in any suitable and known way as by rolling, etc. The blank bar A comprises a longitudinal axial portion 10 and side flange portions 11. The blank bar A, which may be of any suitable length, is then passed through a stamping or cutting machine and transversely cut or sheared on the lines indicated in Fig. 2, thereby forming a plurality of nut blanks 12. It is preferred that the blank bar be cut or sheared as on lines 13 indicated in Fig. 2, the axial portion being cut transversely and the flanges or web portions arcuately and at an angle to said transverse cut, as by such cutting the ears or wings 14 of the nuts are properly formed and there is no substantial waste of the metal of the bar in cutting, the upper edges of one of the nut blanks forming the lower edges of the next nut blank, although it is contemplated that the flanges may be cut along other lines, if desired.

The axial portion 10 of the blank bar is shown as being enlarged and substantially cylindrical in form, or substantially circular in cross section, and the side flanges being shown as reduced radial, diametrically opposed webs, but the invention is in nowise limited to these particular shapes or proportions, as the axial portion may be of any other desired form, the requirement being that the axial portion be of sufficient thickness to be drilled and tapped and constitute the bodies 15 of the wing nut blanks. The flanges 11 may also be of other shapes or proportion and may be disposed in different relations to each other and to the axial portion, and while two flanges are shown in the embodiment illustrated, more than two flanges may be provided, if desired.

Figure 4:
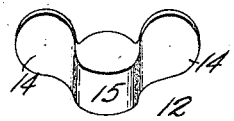
Fig. 4 is a perspective view of an unfinished nut blank made according to the invention.
Figure 5:
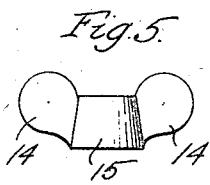
Figs. 5 and 6 are respectively side elevations and bottom plan views of a finished wing nut blank, made according to the invention.
Figure 6:
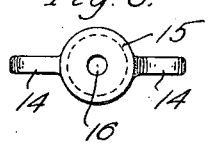

After the nut blanks have been cut or sheared from the bar they are in the form illustrated in Fig. 4. The edges of the body and wings are sharp and clean cut on one side and slightly burred on the other side and the body portion is substantially of cylindrical shape. In order to round off the sharp edges and shape the body to the frusto-conical shape desirable in the finished blank, the unfinished blanks are then put through a press, the dies of which bevel or round the edges of the wings and the upper part of the body and upset the body, leaving the body in the frusto-conical form illustrated in Fig. 5 having a central axial aperture or recess 16 indicating the point for center drilling and tapping.

After the nut blanks have been sheared or stamped and shaped, they may be drilled and tapped in the usual manner, the axial aperture 16 facilitating the drilling and tapping.

It is obvious that the blank bars may be easily and quickly formed of any suitable metal and that the nut blanks may be readily stamped or sheared therefrom.

By this method, wing nuts can be made of steel which produces stronger and more durable wing nuts, and as it is not necessary to heat the metal for any of the operations of the invention, and as the tumbling and grinding or machining is eliminated, the cost of making wing nuts in accordance with this method is less than the cost of those made by the usual forging process. Furthermore, nut blanks made according to this invention facilitate drilling and tapping of the finished nut blanks, are more uniform in proportions, smoother, and more free from flaws than when made according to practices heretofore in use.

I claim as my invention:—

1. A method of manufacturing wing nut blanks, consisting in forming a bar of metal having a longitudinal axial enlarged portion and flange portions of reduced cross section extending outwardly therefrom, and cutting said bar into short pieces in such a manner that the enlarged portion thereof will be cut substantially at right angles to the length of said bar and the flange portions will be cut at an angle to said right angled cut.

2. A method of manufacturing wing nut blanks, consisting in forming a bar of metal having a longitudinal axial enlarged portion and flange portions of reduced cross section extending outwardly therefrom, and cutting said bar into short pieces forming wing nut blanks, said pieces being cut so that the enlarged portion of the bar will form the bodies of the wing nut blanks and the flanges of the bar will form the wings of said blanks, said bar being cut so that the edges of said wing nuts extend at an angle to the body portions.

3. A method of manufacturing wing nut blanks, consisting in providing a bar of metal having a longitudinal axial portion and flange portions of reduced cross section extending outwardly therefrom, cutting said bar into short pieces so that the axial portion of the bar will form the bodies of wing nut blanks and the flanges of the bar will form the wings of said blanks, and pressing the blanks so formed to form the bodies to substantially frusto-conical shape.

4. A method of manufacturing wing nut blanks, consisting in providing a bar of metal having a longitudinal axial portion and flange portions of reduced cross section extending outwardly therefrom, cutting said bar into short pieces so that the axial portion of the bar will form the bodies of wing nut blanks and the flanges of the bar will form the wings of said blanks, and pressing the blanks so formed and upsetting the body portions to bevel the edges of the blanks and provide body portions of substantially frusto-conical shape each with a central aperture in one side thereof.

Witness my hand, this 4th day of September, 1920.

ADAM MUFF.